United States Patent [19]

Kobayashi

[11] Patent Number: 5,004,002
[45] Date of Patent: Apr. 2, 1991

[54] FUEL CHECK VALVE ASSEMBLY FOR FUEL TANK

[75] Inventor: Jiro Kobayashi, Isehara, Japan

[73] Assignee: Nissan Motor Co., Ltd., Yokohama, Japan

[21] Appl. No.: 506,985

[22] Filed: Apr. 10, 1990

[30] Foreign Application Priority Data

Apr. 17, 1989 [JP] Japan .................................. 1-96658

[51] Int. Cl.$^5$ .............................................. F16K 17/36
[52] U.S. Cl. .................................. 137/39; 137/43; 137/508
[58] Field of Search ............................ 137/39, 43, 508

[56] References Cited

U.S. PATENT DOCUMENTS

| | | | |
|---|---|---|---|
| 3,782,410 | 1/1974 | Steuby | 137/508 |
| 4,000,828 | 1/1977 | Crute et al. | 137/43 X |
| 4,694,847 | 9/1987 | Szlaga | 137/39 |

FOREIGN PATENT DOCUMENTS 6275278  5/1987  Japan .

Primary Examiner—Robert G. Nilson
Attorney, Agent, or Firm—Pennie & Edmonds

[57] ABSTRACT

A fuel check valve assembly for use in a fuel tank has a valve seat which is movable upwardly together with a float valve upon increase of a pressure within the fuel tank. Upon further increase of the pressure within the fuel tank, the valve seat is separated from the float valve and solely moves upwards to open the aperture of the valve seat for venting fuel vapor in the fuel tank.

12 Claims, 2 Drawing Sheets

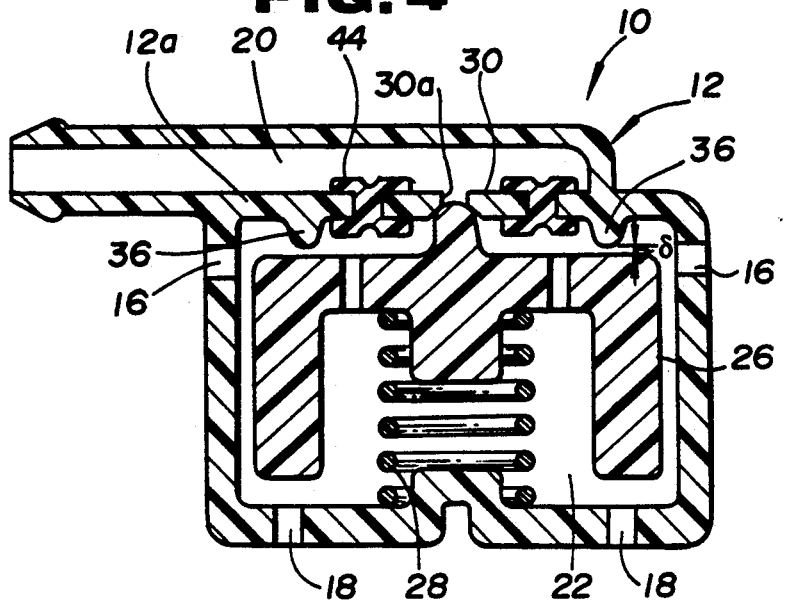
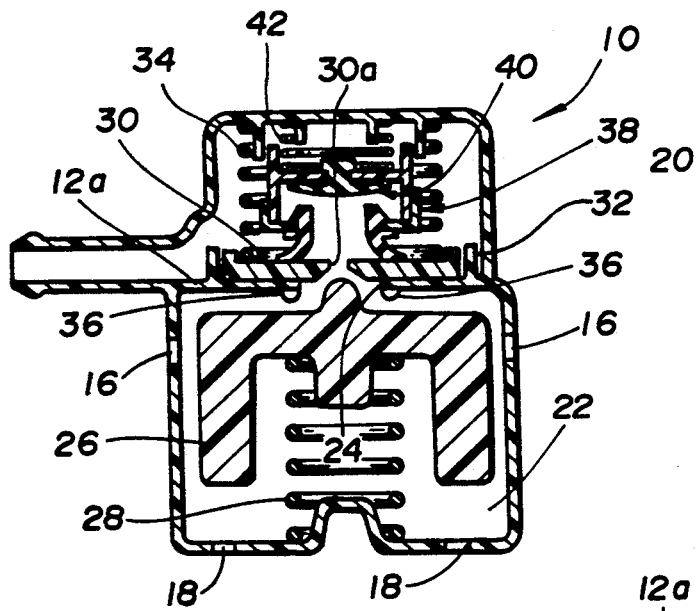
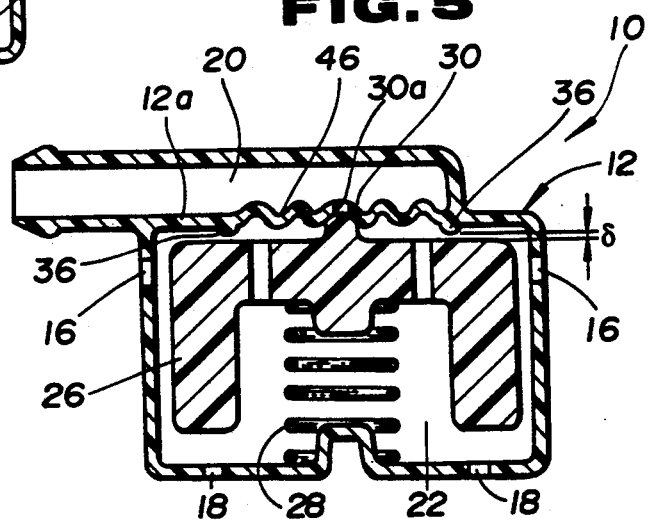

FUEL CHECK VALVE ASSEMBLY FOR FUEL TANK

BACKGROUND OF THE INVENTION

1. Field of the Invention

The present invention relates to a fuel check valve assembly for use in a fuel tank of an automotive vehicle or the like.

2. Description of the Prior Art

As is well known, a fuel tank of an automotive vehicle is equipped with a fuel check valve assembly for preventing outflow of fuel from the fuel tank when the vehicle is inclined or overturned.

An example of a fuel check valve assembly is disclosed in U.S. Pat. No. 4,000,828 and includes a float valve and a valve seat which cooperate to constitute a check valve for preventing outflow of fuel from the fuel tank. The valve seat is movable upwardly so as to constitute a relief valve for venting the fuel tank when the check valve is closed and the pressure within the fuel tank rises.

Another example of a fuel check valve assembly is disclosed in Japanese Utility Model Provisional Publication No. 62-75278 and includes two pairs of valve seats and valves which cooperate to constitute a check valve and a relief valve, respectively.

In either of the fuel check valve assemblies, the valve opening pressure of the relief valve needs to be set low so that the pressure within the fuel tank does not become so high for thereby preventing the float valve from being strongly pressed; against the valve seat to and sticking same.

The valve opening pressure of the relief valve can be set high if the pressure which causes the float valve to stick to the valve seat can be set high. To this end, it is considered to increase the size of the float valve, i.e., to increase the weight of the float valve for thereby making it difficult for the float valve to stick to the valve seat by the effect of the heavy weight. However, this inevitably causes an increase in the weight and coast of the vehicle and is therefore undesirable.

SUMMARY OF THE INVENTION

In accordance with the present invention, there is provided an improved fuel check valve assembly for use in a fuel tank of a vehicle.

The fuel check valve assembly comprises a valve casing installed in the fuel tank to form a passageway for providing communication between the inside and outside of the fuel tank, a valve seat disposed within the valve casing and having an aperture forming part of the passageway, and a float valve disposed within the valve casing and movable toward and away from the valve seat to open and close the aperture.

The valve seat, with the aperture being closed by the float valve, is movable together with the float valve when a pressure within the fuel tank increases in a predetermined range and solely movable away from the float valve to open the aperture when the pressure within the fuel tank increases beyond the above described predetermined range.

The fuel check valve further comprises abutment means abuttingly engageable with the float valve for preventing the passageway from being closed by the float valve when the pressure within the fuel tank is higher than the above described predetermined range.

The above structure is effective for solving the above noted problem inherent in the prior art device.

It is accordingly an object of the present invention to provide an improved fuel check valve for a fuel tank which can prevent outflow of fuel from the fuel tank assuredly.

It is another object of the present invention to provide a fuel check valve of the above described character which can set higher than before a valve actuating pressure or valve opening pressure of a relief valve for venting the fuel tank when a check valve is closed.

It is a further object of the present invention to provide a fuel check valve of the above described character which can assuredly prevent a float valve from sticking to a valve seat and thereby becoming inoperative.

BRIEF DESCRIPTION OF THE DRAWINGS

FIGS. 3 to 5 are sectional views of further embodiments of the present invention.

DESCRIPTION OF THE PREFERRED EMBODIMENTS

Figure 1:
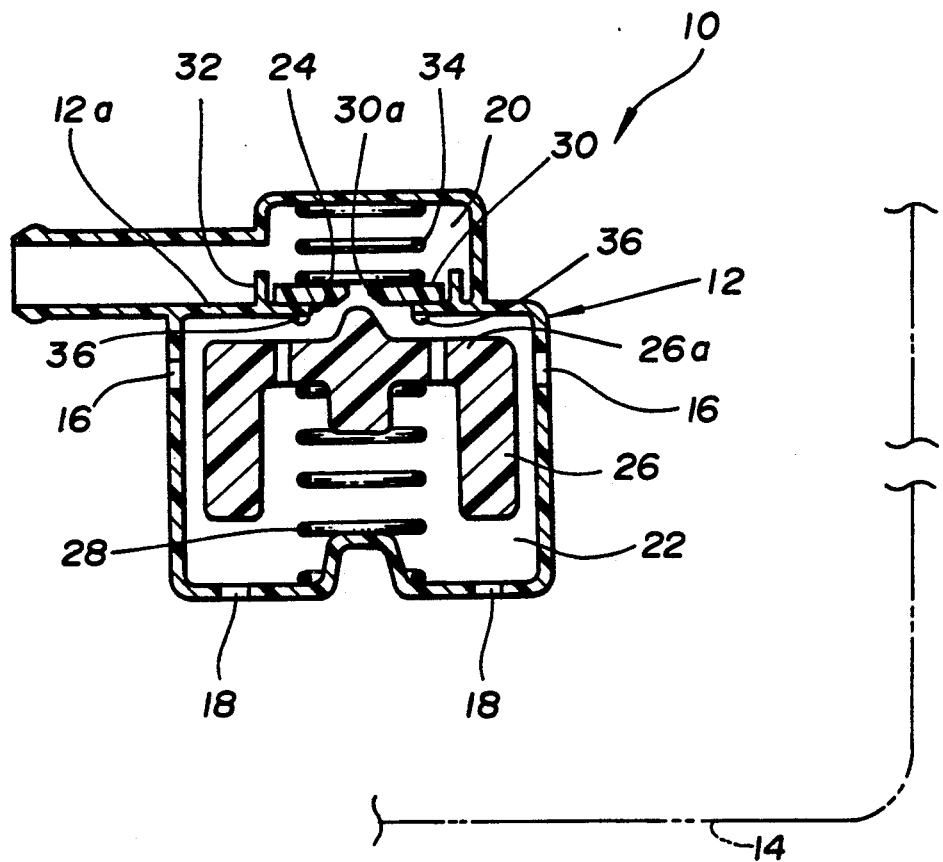
FIG. 1 is a sectional view of a fuel check valve assembly according to an embodiment of the present invention.
Figure 2A:
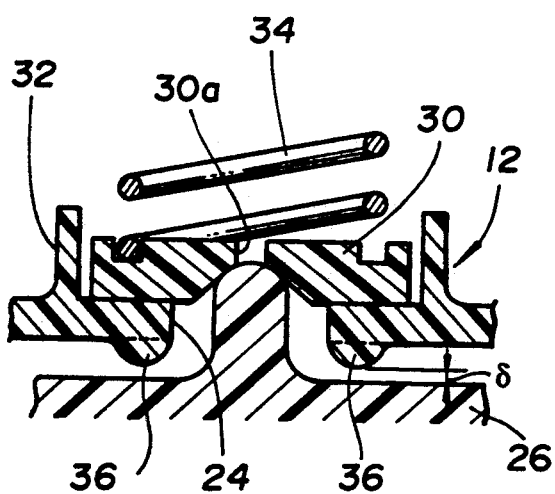
FIG. 2A is an enlarged fragmentary sectional view of the fuel check valve assembly of FIG. 1.
Figure 2B:
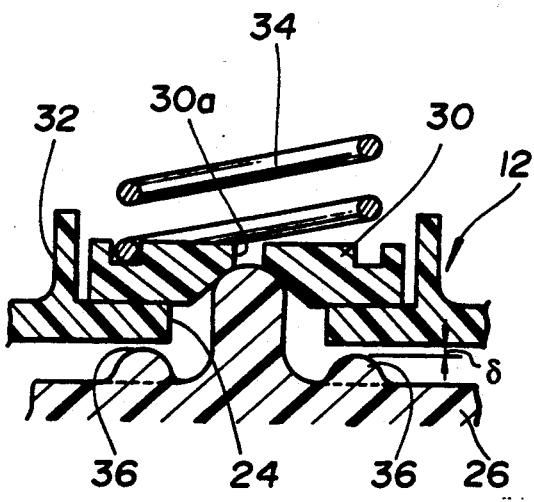
FIG. 2B is a view similar to FIG. 2A but shows a variant of the present invention.

Referring to FIGS. 1 and 2, a fuel check valve assembly 10 includes a valve casing 12 made of a synthetic resinous material and installed in a fuel tank 14 for providing communication between the inside and outside of the fuel tank 14. The valve casing 12 is formed with a plurality of inlet openings 16 and a plurality of drain openings 18. The valve casing 12 has a partition wall 12a for separating the inside thereof into an outlet chamber 20 and a float valve chamber 22. The partition wall 12a is formed with an opening 24 for providing communication between the chambers 20 and 22.

A float valve 26 is made of a synthetic resinous material and installed in the float valve chamber 22 of the valve casing 12. The float valve 6 is urged by a spring 28 toward the partition wall 12a. In this connection, when the fuel tank 14 is in or near a horizontal position thereof, i.e., when the valve casing 12 is not filled with fuel, the float valve 26 is supported by the spring 28 in the position shown in FIG. 1 since the spring 28 is compressed by the weight of the valve float 26 to become shorter. When, however, the vehicle is overturned and the valve casing 12 is filled with fuel, the spring 28 prevails the buoyancy exerted on the float valve 26 and brings the float valve 26 in contact with a valve seat 30.

The valve seat 30 is movably disposed within the outlet chamber 20 of the valve casing 12 so as to cover the opening 24 of the partition wall 12a. The valve seat 30 is formed with an aperture 30a in communication with the opening 24 of the partition wall 12a. Movement of the valve seat 30 toward and away from the partition wall 12a is guided by a guide flange 32 integral with the partition wall 12a. The valve seat 30 is urged by a spring 34 toward the partition wall 12a.

The partition wall 12a is integrally formed with a plurality of abutments 36 in the form of projections on the lower side thereof, i.e., on the float valve chamber side, and around the opening 24. The height of each abutment 36 is set so that a predetermined clearance δ is formed between a neck portion 26a of the float valve 26 and each abutment 36 when the float valve 26 is abuttingly engaged with the abutments 36.

With the foregoing structure, when the valve casing 12 is filled with fuel due to inclination, cornering, etc. of the vehicle, the float valve 26 moves upwards due to the buoyancy exerted thereon and the bias of the spring 28 and abuts upon the valve seat 30 to close the aperture 30a and thereby prevent fuel from flowing out of the fuel tank 14.

When the aperture 30a of the valve seat 30 is closed by the float valve 26, the pressure within the fuel tank 14 rises due to fuel vapor produced and confined within the fuel tank 14. For this reason, the float valve 26 may be kept fittingly in contact with the valve seat 30 being urged by the pressure within the fuel tank 14 even after the vehicle returns to a horizontal position and the valve casing 12 is drained. When this is the case, the pressure within the fuel tank 12 rises further and, when exceeding a predetermined value, causes the float valve 26 to move upwards together with the valve seat 30 until the float valve 26 abuts upon the abutments 36, i.e., causes the float valve 26 to move upwards through the distance δ. After the float valve 26 abuts upon the abutments 36, the valve seat 30 solely moves upwards against the bias of the spring 34, thus opening the aperture 30a and providing communication between the inside and outside of the fuel tank 14. By this, fuel vapor in the fuel tank 14 is vented and absorbed by a canister (not shown), thus lowering the pressure within the fuel tank 14. When the pressure within the fuel tank 14 falls, the float valve 26 and the valve seat 30 return to the former positions thereof assuredly since they are forcedly separated from each other upon upward movements thereof as described above. Accordingly, it becomes possible to prevent sticking of the float valve body 26 and the valve seat 30 assuredly.

In the foregoing, it will be understood that the movable valve seat 30 constitutes part of a relief valve for venting the fuel tank 14 when a check valve partly constituted by the float valve 26 is closed.

It will be further understood that the valve opening pressure of the relief valve is determined by the spring 34 and can be set high since the float valve 26 and the valve seat 30 are forcedly separated from each other upon upward movements thereof, thus making it possible to assuredly prevent outflow of fuel from the fuel tank 14.

FIG. 3 shows another embodiment which differs from the previous embodiment of FIGS. 1 and 2 in that the valve seat 30 is provided with a relief valve 38 and a check valve 40. The relief valve 38 is concentrically disposed on the upper side of the valve seat 30 and resiliently held in place by means of a spring 42. The check valve 40 allows inflow of air toward the fuel tank 14 and prevents outflow of fuel vapor from the fuel tank 14.

In operation, the aperture 30a of the valve seat 30 first opens in response to increase of the pressure within the fuel tank 14, and then the relief valve 38 opens prevailing the bias of the spring 42 for thereby venting the fuel tank 14.

When consumption of fuel causes vacuum within the fuel tank 14, the check valve 40 opens to draw air into the fuel tank 14 and thereby maintain the inside of the fuel tank 14 at the atmospheric pressure.

FIG. 4 shows a further embodiment which differs from the previous embodiment of FIGS. 1 and 2 in that the valve seat 30 is resiliently attached to the partition wall 12a by means of an annular resilient or elastic member 44 made of rubber, etc. By suitably determining the resiliency or elasticity of the elastic member 44, this embodiment can produce substantially the same effect as the previous embodiment of FIGS. 1 and 2.

FIG. 5 shows a still further embodiment which differs from the previous embodiment of FIG. 4 in that a resiliently or elastically deformable diaphragm 46 in the form of bellows is interposed between the valve seat 30 and the partition wall 12a to integrally interconnect the same. This embodiment can produce substantially the same effect as the previous embodiment of FIGS. 1 and 2.

What is claimed is:

1. A fuel check valve assembly in a fuel tank of a vehicle, comprising:
   a valve casing installed in the fuel tank to form a passageway for providing communication between the inside and outside of the fuel tank;
   a valve seat installed in said valve casing and having an aperture forming part of said passageway;
   a float valve disposed within said valve casing and movable toward and away from said valve seat to open and close said aperture;
   said valve seat, with said aperture being closed by said float valve, being movable together with said float valve when a pressure within the fuel tank increases in a predetermined range and solely movable away from said float valve to open said aperture when the pressure within the fuel tank increases beyond said predetermined range; and
   abutment means abuttingly engageable with said float valve for preventing said passageway from being closed by said float valve when the pressure within the fuel tank is higher than said predetermined range.

2. The fuel check valve assembly as claimed in claim 1 wherein said valve casing includes a partition wall separating the inside thereof into an outlet chamber and a float valve chamber forming part of said passageway, said float valve being installed in said float valve chamber, said partition wall being formed with an opening forming part of said passageway, said abutment means comprising a plurality of projections formed on said partition wall.

3. The fuel check valve assembly as claimed in claim 1 wherein said valve casing includes a partition wall separating the inside thereof into an outlet chamber and a float valve chamber forming part of said passageway, said float valve being installed in said float valve chamber, said partition wall being formed with an opening forming part of said passageway, said abutment means comprising a plurality of projections formed on said float valve.

4. The fuel check valve assembly as claimed in claim 2 wherein said valve seat is disposed in said outlet chamber and movable toward and away from said partition wall.

5. The fuel check valve assembly as claimed in claim 4, further comprising first biasing means disposed in said outlet chamber for urging said valve seat toward partition wall and second biasing means disposing in said float valve chamber for urging said float valve toward said partition wall, said second biasing means holding said float valve spaced away from said valve seat when said float valve chamber is drained, said first biasing means holding said valve seat in contact with aid partition wall when said valve seat is out of contact with said float valve.

6. The fuel check valve assembly as claimed in claim 5, wherein said second biasing means holding said float valve in contact with said valve seat when said float valve chamber is filled, buoyancy of said float valve urging said float valve against said valve seat.

7. The fuel check valve assembly as claimed in claim 6, further comprising guide means for guiding movement of said valve seat toward and away from said partition wall.

8. The fuel check valve assembly as claimed in claim 7 wherein said guide means comprises a flange formed integral with said partition wall.

9. The fuel check valve assembly as claimed in claim 8, further comprising a relief valve and a check valve disposed in said outlet chamber to form part of said passageway, said relief valve allowing only outflow of fluid from the fuel tank, said check valve allowing only inflow of fluid toward the fuel tank, said relief valve being opened only after said aperture of said valve seat is opened.

10. The fuel check valve assembly as claimed in claim 2, further comprising resilient means disposed in said opening of said partition wall for resiliently and sealingly interconnecting said valve seat and said partition wall.

11. The fuel check valve assembly as claimed in claim 10 wherein said resilient means comprises an annular resilient member made of rubber.

12. The fuel check valve assembly as claimed in claim 11 wherein said resilient means comprises a diaphragm in the form of bellows and integrally formed with said valve seat and said partition wall.

* * * * *